(12) United States Patent
Murthy et al.

(10) Patent No.: US 7,756,005 B2
(45) Date of Patent: Jul. 13, 2010

(54) COARSE TIMING/FRAME ACQUISITION OF OFDM SYSTEM USING TIME DIVISION MULTIPLEXED PILOT SYMBOL

(75) Inventors: Vinay Murthy, San Diego, CA (US); Alok Kumar Gupta, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 709 days.

(21) Appl. No.: 11/371,039

(22) Filed: Mar. 8, 2006

(65) Prior Publication Data

US 2006/0215538 A1   Sep. 28, 2006

Related U.S. Application Data

(60) Provisional application No. 60/660,915, filed on Mar. 11, 2005.

(51) Int. Cl.
*H04J 11/00* (2006.01)
(52) U.S. Cl. .................................................. 370/208
(58) Field of Classification Search ............... 370/208, 370/310, 343, 345, 350, 276, 277, 281, 295, 370/464, 480–482, 498, 503, 509–513, 520, 370/203; 375/354, 359, 362, 364
See application file for complete search history.

(56) References Cited

U.S. PATENT DOCUMENTS

| | | | | |
|---|---|---|---|---|
| 5,428,647 A | * | 6/1995 | Rasky et al. | 375/366 |
| 5,444,697 A | * | 8/1995 | Leung et al. | 370/207 |
| 5,812,523 A | * | 9/1998 | Isaksson et al. | 370/208 |
| 5,991,289 A | * | 11/1999 | Huang et al. | 370/350 |
| 6,111,919 A | * | 8/2000 | Yonge, III | 375/260 |
| 6,151,295 A | | 11/2000 | Ma et al. | |
| 6,658,063 B1 | * | 12/2003 | Mizoguchi et al. | 375/260 |
| 6,700,866 B1 | * | 3/2004 | Heinonen et al. | 370/208 |
| 6,704,374 B1 | * | 3/2004 | Belotserkovsky et al. | 375/326 |
| 6,711,221 B1 | * | 3/2004 | Belotserkovsky et al. | 375/355 |
| 7,058,151 B1 | | 6/2006 | Kim | |
| 2004/0005018 A1 | | 1/2004 | Zhu et al. | |
| 2004/0223449 A1 | | 11/2004 | Tsuie et al. | |

FOREIGN PATENT DOCUMENTS

| | | |
|---|---|---|
| EP | 1608094 | 12/2005 |
| WO | 9602990 | 2/1996 |
| WO | WO 00/77961 A1 | 12/2000 |
| WO | WO 2004/008706 A2 | 1/2004 |
| WO | WO 2005/022797 A2 | 3/2005 |

OTHER PUBLICATIONS

Lawrey, E, Multiuse OFDM, 1999,Signal Processing Research Center, QUT, vol. 1, 761-764.*

(Continued)

*Primary Examiner*—Pankaj Kumar
*Assistant Examiner*—Gautam Sharma
(74) *Attorney, Agent, or Firm*—Gerald P. Joyce, III

(57) ABSTRACT

Systems and methods are provided for processing Time Domain Multiplexing (TDM) symbols via delayed correlation in the time domain. In one embodiment, a method is provided for determining synchronization information in an Orthogonal Frequency Division Multiplexing (OFDM) broadcast. The method includes employing a time domain correlation to detect the start of an OFDM super frame and utilizing the time domain correlation to synchronize a receiver to the carrier frequency of the OFDM signal.

30 Claims, 10 Drawing Sheets

OTHER PUBLICATIONS

International Search Report - PCT/US06/009470, International Searching Authority - European Patent Office, Jul. 5, 2006.

Written Opinion - PCT/US06/009470, International Searching Authority - European Patent Office, Jul. 5, 2006.

* cited by examiner

COARSE TIMING/FRAME ACQUISITION OF OFDM SYSTEM USING TIME DIVISION MULTIPLEXED PILOT SYMBOL

CROSS REFERENCE TO RELATED APPLICATION

This application claims the benefit of U.S. Provisional Patent Application Ser. No. 60/660,915 filed on Mar. 11, 2005, entitled "TDM Pilot1 Processor" the entirety of which is incorporated herein by reference.

BACKGROUND

I. Field

The subject technology relates generally to communications systems and methods, and more particularly to systems and methods that determine frame synchronization information in an OFDM system by applying time domain processing to received pilot symbols.

II. Background

One technology that has dominated wireless systems is Code Division Multiple Access (CDMA) digital wireless technology. In addition to CDMA, an air interface specification defines FLO (Forward Link Only) technology that has been developed by an industry-led group of wireless providers. The basic signal unit for FLO™ transmission is an Orthogonal Frequency Division Multiplexing (OFDM) symbol that consists of 4642 time-domain base-band samples called OFDM chips. Among these OFDM chips are 4096 data chips. The data chips are cyclically extended on each side, with 529 cyclically extended chips preceding the data portion and 17 following the data portion. To reduce the OFDM signal's out-band energy, the first 17 chips and the last 17 chips in an OFDM symbol have a raised cosine envelope. The first 17 chips of an OFDM symbol overlap with the last 17 chips of the OFDM symbol that precede them. As a result, the time duration of each OFDM symbol is 4625 chips long.

Before transmission, FLO data is generally organized into super frames. Each super frame has one second duration. A super frame generally consists of 1200 symbols (or variable number of OFDM symbols based on the bandwidth being used) that are OFDM modulated with 4096 sub-carriers. Among the 1200 OFDM symbols in a super frame, there are: Two TDM pilot symbols (TDM1, TDM2); One wide-area and 1 local identification channel (WIC and LIC) symbols; Fourteen OIS channel symbols, including four Transitional Pilot Channel (TPC) symbols; A variable number of two, six, 10, or 14 PPC symbols for assisting with position location; and Four data frames.

Time Division Multiplexing (TDM) Pilot Symbol 1 (TDM1) is the first OFDM symbol of each super frame, where TDM1 is periodic and has a 128 OFDM chip period. The receiver uses TDM1 for frame synchronization and initial time (course timing) and frequency acquisition. Following TDM1, are two symbols that carry the wide-area and local IDs, respectively. The receiver uses this information to perform proper descrambling operations utilizing the corresponding PN sequences. Time division Multiplexing pilot Symbol 2 (TDM2) follows the wide-area and local ID symbols, where TDM2 is periodic, having a 2048 OFDM chip period, and contains two and a fraction periods. The receiver uses TDM2 when determining accurate timing for demodulation.

Following TDM2 are: One wide-area TPC (WTPC) symbol; Five wide-area OIS symbols; Another WTPC; One local TPC (LTPC) symbol; Five local OIS symbols; Another LTPC; and Four data frames follow the first 18 OFDM symbols described above. A data frame is subdivided into a wide-area data portion and a local data portion. The wide-area Data is pre-pended and appended with the wide-area TPC—one on each end. This arrangement is also used for the local data portion. One important aspect is the initial processing of super frame information in order to determine such aspects as the start of a new super frame such that further frame information can be synchronized and determined there from. Such determinations have been performed in the past via frequency domain processing which has led to increased complexity and expense when processing OFDM information.

SUMMARY

The following presents a simplified summary of various embodiments in order to provide a basic understanding of some aspects of the embodiments. This summary is not an extensive overview. It is not intended to identify key/critical elements or to delineate the scope of the embodiments disclosed herein. Its sole purpose is to present some concepts in a simplified form as a prelude to the more detailed description that is presented later.

Systems and methods are provided for determining timing and frame synchronization in an Orthogonal Frequency Division Multiplexing (OFDM) system. In one embodiment, time domain processing is applied to received Time Division Multiplexing Pilot 1 symbols (TDM1), where TDM1 is applied to a delayed correlator component. Output from the delayed correlator generates a well defined ramp in the time domain that can then be detected by comparing an edge of the ramp to a predetermined threshold. In one example, a TDM1 detection block provides a delay-and-correlate component or circuit; where the component correlates a received sample sequence with a sequence delayed by 128 samples. Since TDM1 is periodic and each period is 128 samples, and since other OFDM symbols do not share this characteristic, output of the detector will have a significantly larger magnitude when TDM1 is present than when it is not present. In addition, the phase of the correlator output is proportional to the frequency offset between the carrier frequency of the received signal and a receiver local oscillator frequency.

When the detector determines the presence of TDM1, based on the magnitude of the correlator output, an automatic frequency control (AFC) circuit starts the initial frequency acquisition using the phase of the correlatDuring the correlation operationAt about the same time, it continues to check the reliability of the detection while observing for the end of TDM1 (the trailing edge of the detector output). Data and further timing acquisition can then be based on multiple observations of the correlator output when the output exceeds the predetermined threshold. In one embodiment, a method is provided for determining synchronization information in an Orthogonal Frequency Division Multiplexing (OFDM) broadcast. The method includes employing a time domain correlation to perform frame synchronization of sample an OFDM super frame and utilizing the time domain correlation sample to synchronize a receiver to a frequency component of the OFDM super frame. An Automatic Frequency Loop is updated at the end of the TDM1 detection process by the phase of the correlator output which is proportional to the frequency offset between the carrier frequency and the receiver local oscillator.

To the accomplishment of the foregoing and related ends, certain illustrative embodiments are described herein in connection with the following description and the annexed drawings. These aspects are indicative of various ways in which the embodiments may be practiced, all of which are intended to be covered.

DETAILED DESCRIPTION

Systems and methods are provided for processing Time Domain Multiplexing Pilot 1 (TDM1) symbols via correlation in the time domain with the delayed samples. In one embodiment, a method is provided for determining synchronization information in an Orthogonal Frequency Division Multiplexing (OFDM) broadcast. The method includes employing a time domain correlation to detect the start of an OFDM super frame and utilizing the time correlation operation to correct the initial frequency offset between the transmitter frequency and the local receiver frequency. In one example, the sample can be employed in a forward link only system.

As used in this application, the terms "component," "network," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable non-transitory media having various data structures stored thereon. The components may communicate over local and/or remote processes such as in accordance with a signal having one or more data packets (e.g., data from one component interacting with another component in a local system, distributed system, and/or across a wired or wireless network such as the Internet).

Figure 1:
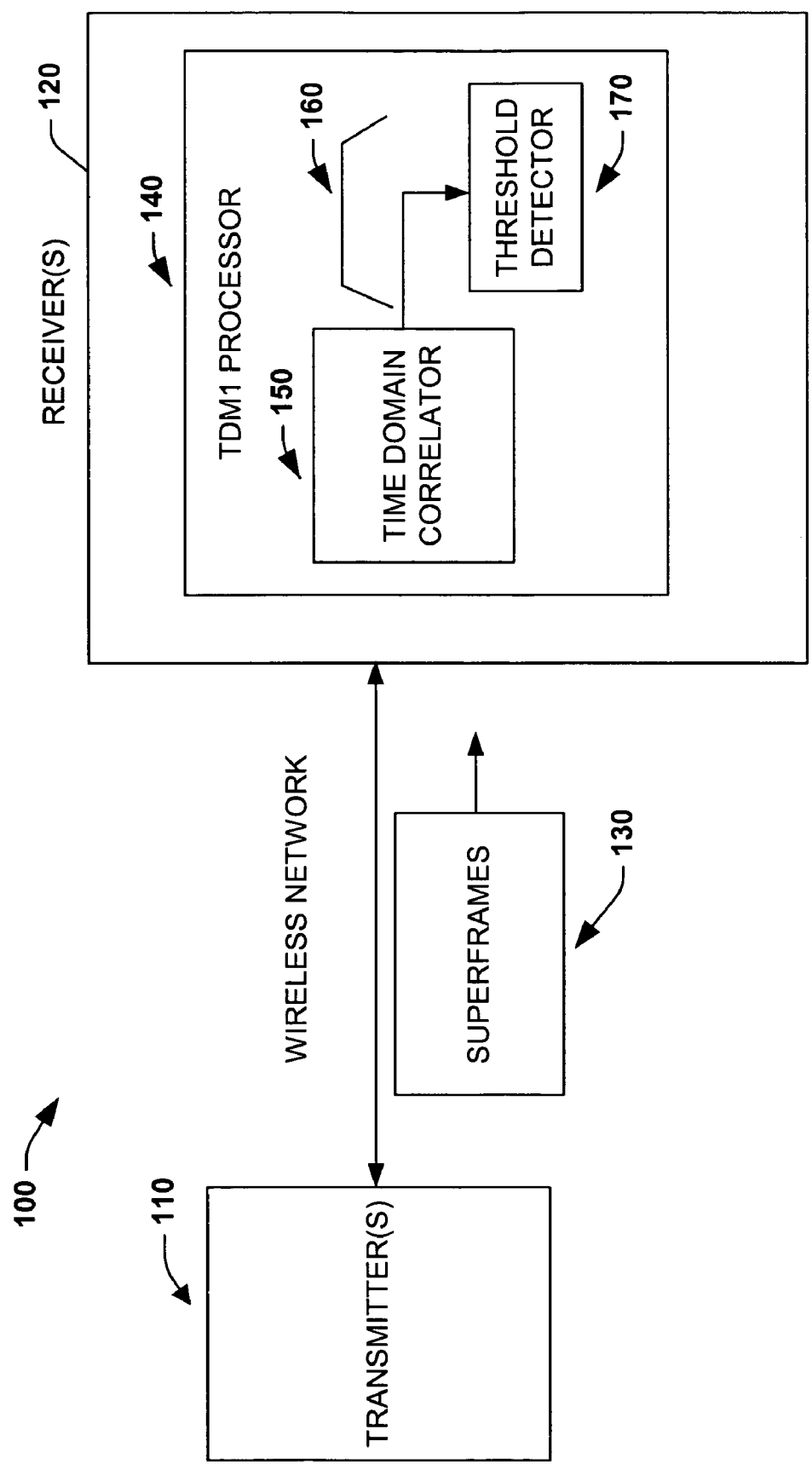
FIG. 1 is a schematic block diagram illustrating a time domain correlator for a wireless receiver.

FIG. 1 illustrates time domain correlation for a wireless network system 100 for determining timing synchronization and frequency offset. The system 100 includes one or more transmitters 110 that communicate across a wireless network to one or more receivers 120. The receivers 120 can include substantially any type of communicating device such as a cell phone, computer, personal assistant, hand held or laptop devices, and so forth. Portions of the receiver 120 are employed to decode and process a super frame 130 and other data such as multimedia data. The super frame 130 is generally transmitted in an Orthogonal Frequency Division Multiplexing (OFDM) network that employs forward link only FLO® protocols for multimedia data transfer. As illustrated, a Time Division Multiplexing Pilot 1 processor is provided to process the super frame and determine timing, and frequency offset. A time domain correlator 150 receives the super frame 130 and generates a ramp output signal 160 when it encounters a TDM1 OFDM symbol, where it is noted that TDM1 and TDM Pilot 1 are equivalent terms. From the ramp output 160, a threshold detector 170 employs a threshold to determine when a leading or trailing edge on the ramp has exceeded a predetermined threshold which can be programmed in the TDM1 processor 140, if desired. If the threshold has been exceeded for a predetermined time, detection for TDM1 can be signaled and employed to synchronize operations of the receiver 120 with the super frame 130. Other aspects include detecting real and imaginary phase components (e.g., I/Q) and sending to an automatic frequency control block (not shown).

Output from the time domain correlator 150 generates a well defined ramp in the time domain that can then be detected by comparing an edge of the ramp to a predetermined threshold in the detector 170. In one example, the TDM1 processor 140 provides a delay-and-correlate circuit 150, where the circuit correlates a received sample sequence with a sequence delayed by 128 samples. Since TDM1 is periodic and each period is 128 samples, and since other OFDM symbols do not share this characteristic, output of the detector 170 will have a significantly larger magnitude when TDM1 is present than when it is not present. In addition, the phase of the time domain correlator 150 output is proportional to the frequency offset between the carrier frequency of the received signal and the receiver 120 local oscillator frequency. After detection of the rising edge of the correlator output, it continues to check the reliability of the detection while observing for the end of TDM1—the trailing edge of the detector output at 160. Data and further timing acquisition can then be based on multiple observations of the correlator output 160 when the output exceeds the predetermined threshold stored or programmed in the detector 170. In one embodiment, the system 100 determines timing data in a wireless network. The system 100 includes means for analyzing a super frame (reference 150) to detect a signal magnitude in the time domain and means for detecting the signal magnitude (reference 170) to determine a start timing signal for the super frame 130. An automatic frequency loop (AFC) is updated at the end of detection of the TDM1 OFDM symbol by a value that is proportional to the phase of the correlator output.

Figure 2:
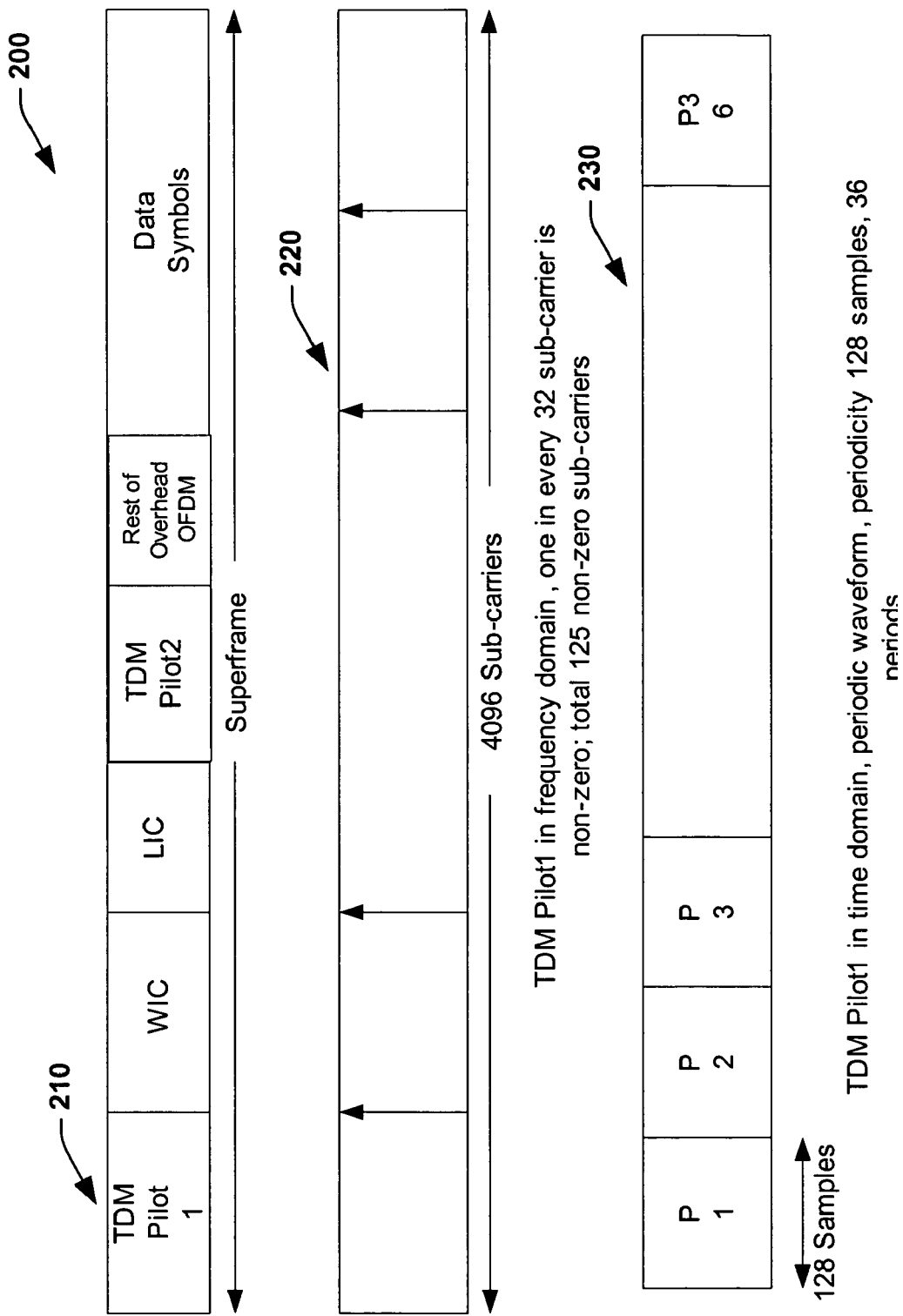
FIG. 2 illustrates an example super frame structure.

FIG. 2 illustrates an example super frame structure 200. On initial power-on, after an automatic gain control (AGC) is settled, a modem acquires the frame and coarse OFDM symbol timing as well as frequency by processing a TDM Pilot 1 symbol 210. In the time domain, TDM Pilot 1 at 210 consists of 36 periods of a sequence of length 128. The structure of TDM Pilot 1 simplifies the implementation of the correlator used for its detection. The structure is also well suited for frequency estimation in severe multi-path channels as the waveform periodicity is preserved for the most part. At 220, TDM1 is shown as having 4096 sub-carriers in the frequency domain of which only one in thirty-two is non-zero, whereas at 230, TDM1 is broken into 128 samples in the time domain and then repeated 36 times.

Since the TDM Pilot 1 210 marks the beginning of each 1 second super frame, the task of frame synchronization reduces to the detection of the TDM Pilot 1 symbol. The time domain periodic structure of TDM Pilot 1 210 is exploited for its detection and estimation of coarse OFDM symbol timing. The TDM1 Pilot 1 symbol 210 is also used for the initial frequency estimation. The initial frame, time and frequency synchronization are achieved by processing the output of a delayed correlation component as described in more detail below. The received signal, with an initial phase offset φ and the frequency offset Δf, is given by:

$$r(t)=x(t)e^{j(2\pi\Delta ft+\phi)}+n(t) \qquad (1)$$

where x(t) is the TDM Pilot 1 signal. It is noted that x(t)=x(t+T), where T is the periodicity of TDM Pilot 1. The sampled version of the received signal is:

$$r(kT_s)=x(kT_s)e^{j(2\pi\Delta f ks+\phi)}+n(kT_s) \qquad (2)$$

where $T_s$ is the sampling period and k denotes the time index. If $r_k=r(KT_s)$, $x_k=x(KT_s)$, $n_k=n(KT_s)$, and $\Delta f'=\Delta f/f_s$ (frequency error normalized to sampling frequency), then:

$$r_k = x_k e^{j2\pi k\Delta f'+\phi}+n_k \qquad (3)$$

The following decision statistics are then formed:

$$S_k = \sum_{j=k-(P-1)}^{k} r_j r^*_{j-P} = Z^I_k + jZ^Q_k \qquad (4)$$

where P is the period of TDM Pilot 1 in number of samples. The acquisition is based on the event that the magnitude of the correlator output exceeds a predetermined threshold T which is described in more detail below.

Figure 3:
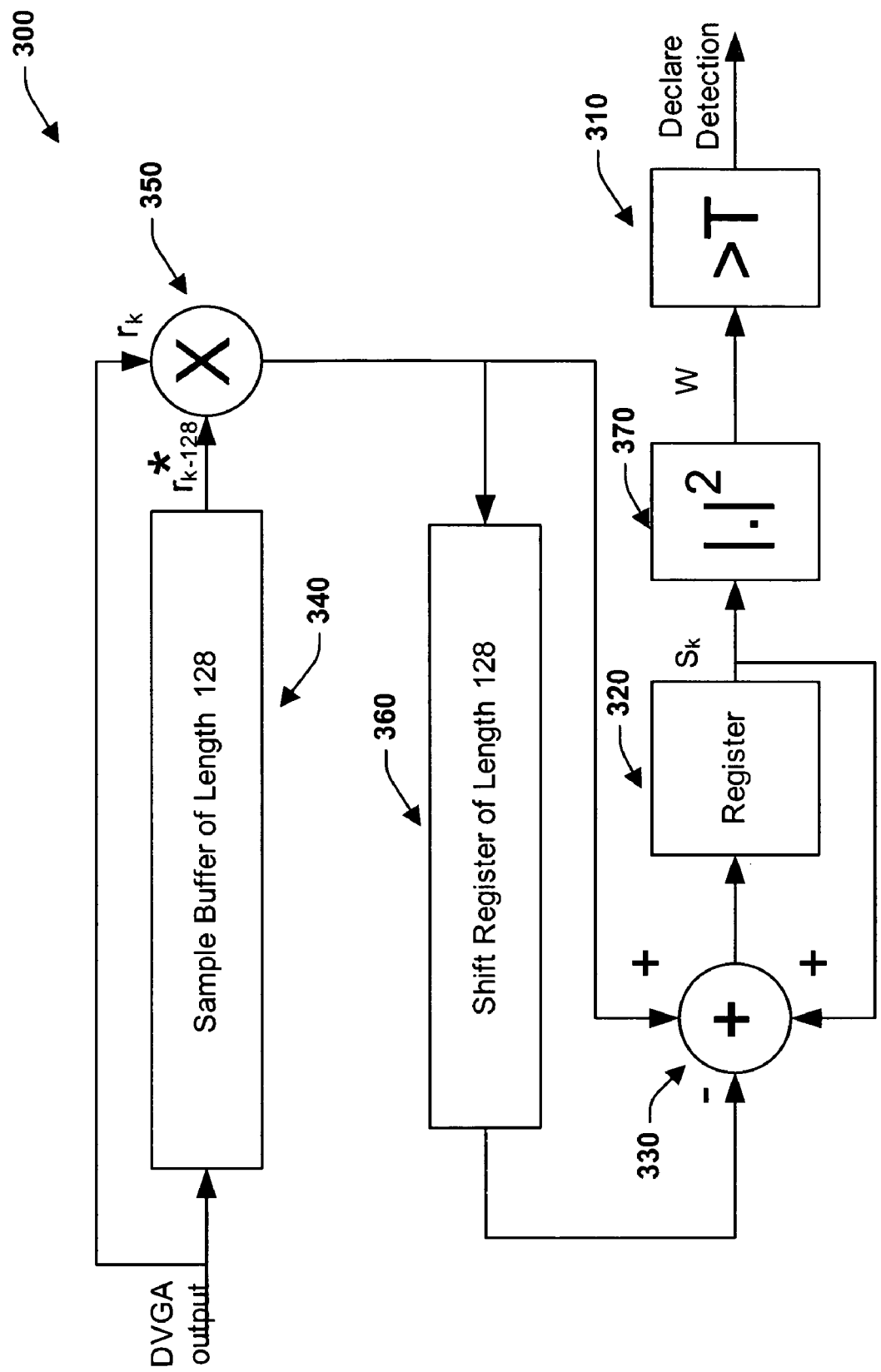
FIG. 3 illustrates an example delayed correlator component for a wireless receiver.

FIG. 3 illustrates an example delayed correlator component 300. In general, timing and data acquisition can be based on multiple observations of the correlator output when it exceeds a threshold T 310. A sliding window integration over the length of 128 samples can be implemented by adding the newest term ($r_k r^*_{k-128}$) to an accumulator 320 and subtracting the oldest term ($r_{k-128} r^*_{k-256}$) from it at 330. Self-correlating a periodic waveform of periodicity P can include an input buffer of length P at 340 to hold the last P input samples, and a single complex multiplier at 350. A shift register or memory 360 of length P holds the last P product terms, wherein the component at 330 provides a complex adder and a subtractor. A magnitude squared term is supplied to a threshold comparator at 310 to determine the presences of TDM1 in the time domain. The magnitude of the delayed correlator output in a single path channel that has no noise when TDM Pilot 1 is present is shown in at 400 of FIG. 4. The delayed correlator output can be used for the detection of TDM Pilot1 for frame synchronization and initial OFDM symbol timing estimation. The phase of the correlator output can be used for the estimation of the initial frequency offset.

Figure 4:
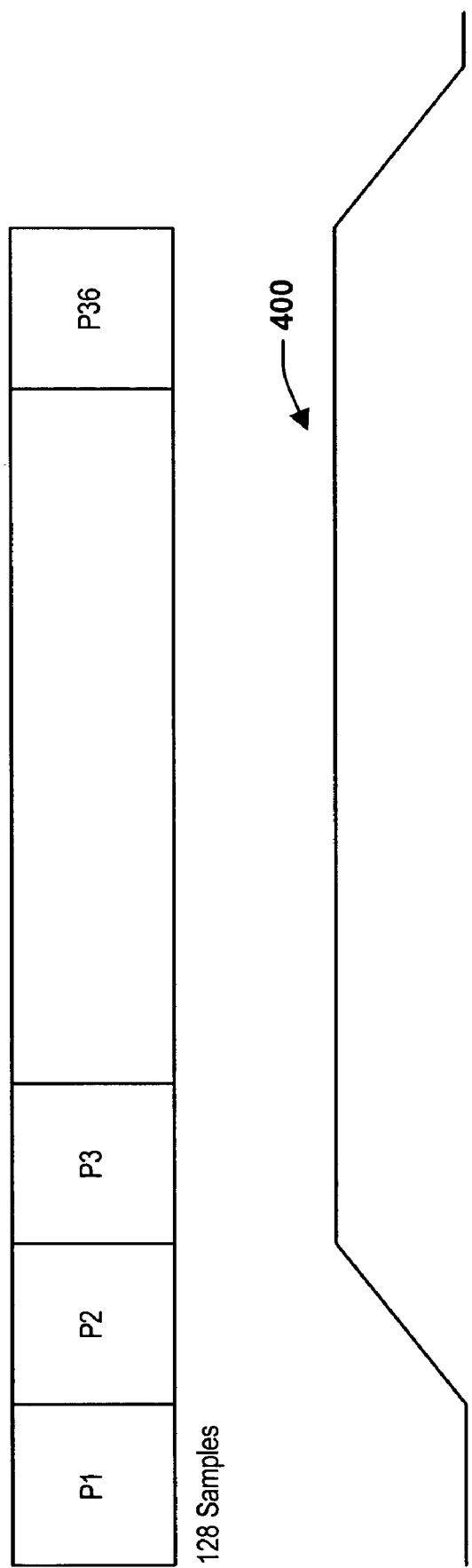
FIG. 4 illustrates an example magnitude output for a time domain correlator detector.
Figure 5:
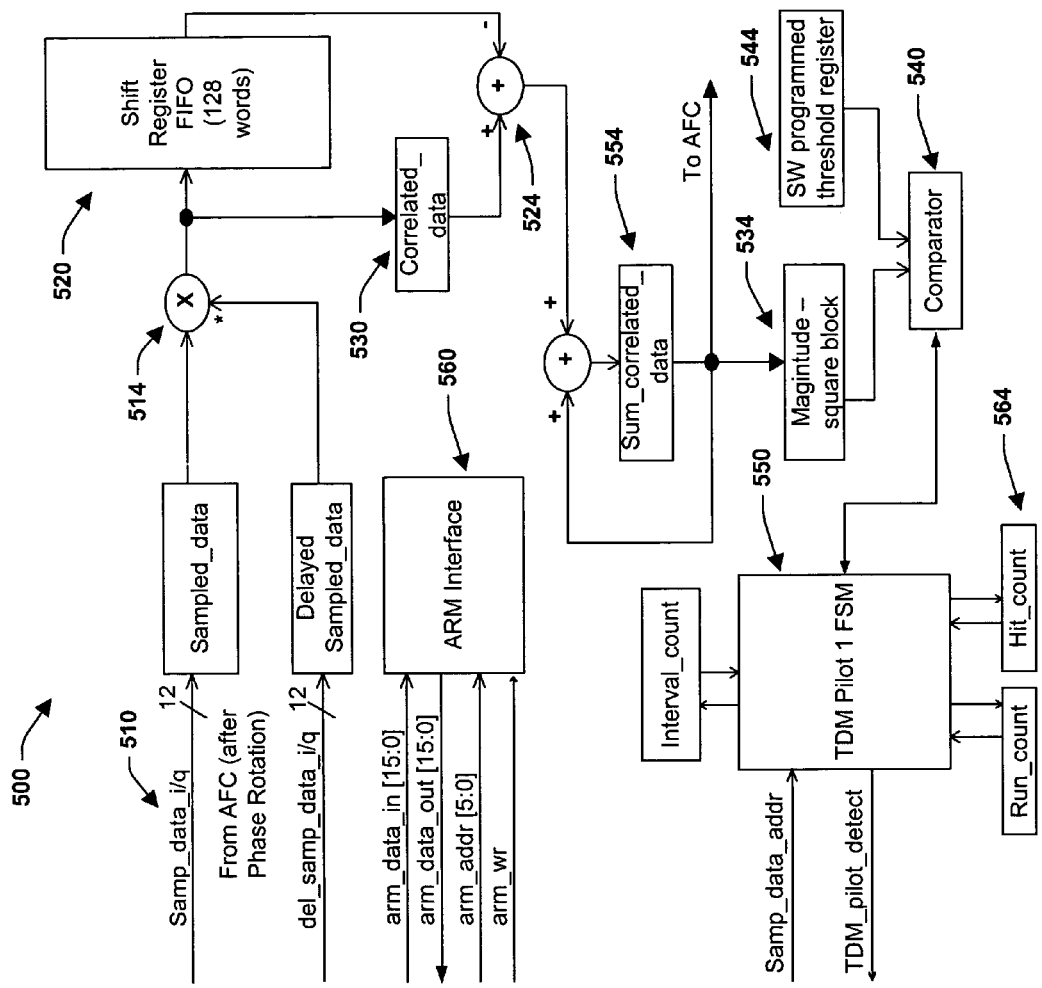
FIG. 5 is illustrates an example state machine for time domain multiplexing pilot processing.

FIG. 5 illustrates example implementation 500 of TDM Pilot 1 processing. A samp_data_i/q and the 128-delayed del_samp_data_i/q are input from an AFC module at 510. At each sampling clock, the samp_data value and the del_samp_data are correlated as $r_j r^*_{j-128}$ at 514. The output of the correlator (complex multiplier) 514 is stored in a Shift_register FIFO 520, which can be an SRAM with the size 128×12. The correlator output 514 is also added 524 to a value stored in a sum_correlated_data accumulator 530—moving window sum of 128 consecutive correlated outputs. In the same sampling clock interval, the 128-delayed correlator value read from the Shift_register FIFO 520 is subtracted from the sum_correlated_data accumulator at 524. The Shift_register FIFO 520 is a circular buffer where a read pointer trails the write pointer by 128. The magnitude square of a "truncated" version of the sum_correlated_data at 534 is compared at 540 to a software-programmed threshold value at 544 in every sampling clock interval, with the result reported to a TDM Pilot 1 state machine 550. During a "flat-zone" of the TDM Pilot1 detection as shown in FIG. 4 at 400, the output of sum_correlated data (I and Q) at 554 is written to an sum accumulator once every 128 sampling clocks. At the end of TDM1 detection, the sum accumulator value is written to the AFC block. The AFC block uses the $\tan^{-1}(Q/I)$ formula to calculate the frequency error between the TX clock and the local RX clock.

An ARM Interface module 560 allows software to write to control registers that affect this block 500 and the AFC block. When TDM1 detection is reliable and the end of TDM1 is confirmed, the receiver assumes that the local clock has approximately synchronized to the carrier frequency after the AFC block has been updated. Frame synchronization is also achieved with high probability. A rough OFDM symbol timing estimate is determined based on the measurement of the falling edge of the correlator output during TDM1. The determined timing accuracy should be within a few hundred chips of the exact timing. The AFC block has two counters that determine the timing. An ofdm_symbol_counter tracks the OFDM symbol number in the Superframe. The falling edge of the TDM Pilot1 correlator output is marked as OFDM symbol '1', with TDM Pilot1 being considered as OFDM symbol '0'. It is noted that the falling edge of the correlator output occurs in the symbol after the TDM Pilot1 OFDM symbol. The second counter in AFC, intra_ofdm_counter, tracks the sample number in the OFDM symbol. The intra_ofdm_counter is initialized with a value of (256−17) on the detection of the falling edge of the correlator output. At this point, the receiver is ready to demodulate WIC and LIC symbols and then process the TDM Pilot2 (also referred to as TDM2) to acquire fine time synchronization.

The ARM interface module 560 implements software registers that control the TDM Pilot1 and AFC blocks. The TDM Pilot1 FSM implements the state machine responsible for detecting the TDM Pilot1. The receiver determines the local- and wide-area networks in which it is operating from the WOI and LOI ID symbols following the TDM1. The information is used to set up the correct scrambling sequences to properly descramble the data symbols. TDM2 is periodic and each period is 2048 chips. According to the rough timing estimate determined based on TDM1, a fine timing determination block operates on a segment of 2048 samples of TDM2 to generate an estimate of the time-domain transmission channel. The channel estimate of length 2048 is generated from the 2048 chips of TDM2 and it is circularly shifted by the amount equal to the rough timing error. If the span of the true channel is less than 1024 chips, the receiver can uniquely determine the delay and profile of the channel. The initial accurate timing (i.e., the position of the FFT window) can be derived from the profile and the delay of the channel estimate.

In general, the initial acquisition procedure based on the doing the correlation of the TDM1 symbol has three stages. It is to be appreciated that the following example hard-coded numbers in the following description are for illustration of an example embodiment. In one implementation of these embodiments, these numbers are programmable via software. During the first stage, an algorithm searches for the leading edge of the correlation curve. The magnitude square of the correlator output is compared with programmable threshold T at 540. If the correlator output exceeds the threshold consecutively for 64 input samples (or other determined amount), the algorithm enters the second stage of the acquisition process.

In the second stage, a hit count at 564 is incremented each time the magnitude square of the correlator output exceeds the threshold at 540. The algorithm can return to the first stage if it determines that the leading edge observed was false. This is indicated by the correlator output remaining below the threshold for greater than or equal to 128 input samples and the hit count being less than 400.

The algorithm remains in the second stage for at least 34 periods or until it observes a consistent trailing edge of the correlation curve. The algorithm leaves the second stage (a consistent trailing edge is found) when the correlator output remains below the threshold for 768 input samples and the hit count is greater than or equal to 400. The algorithm also exits the flat zone if it has stayed for at least 4352 samples (34*128).

The accumulator sum of the correlator output is updated once every 128 samples during the second stage. If the trailing edge was not observed in the second stage, the observation continues during the third stage. In the third stage, if the correlator output remains below the threshold for a minimum of 32 consecutive input samples and if the correlator output exceeded the threshold for at least 2000 input samples during the second stage, TDM1 detection is declared. The AFC loop is updated with the value of the accumulator sum. The phase value of the accumulator sum, which is proportional to the frequency offset is used to correct the frequency error between the transmitter and the receiver.

The initial OFDM symbol time estimate is based on the trailing edge of the waveform depicted in FIG. 4. The time instance when the correlator output transitions below the threshold for the last time during observation of the trailing edge is taken as the 239th (256−17) sample of the next OFDM symbol (TDM pilot 2). If the hit count at 560 is found to be less than 2000 or a consistent trailing edge during a time-out period of 1024 input sample in stage 3 is not observed, the algorithm resets the counts and returns to the first stage to observe another leading edge. The sum accumulator of the correlator is not sent to the AFC block and sum accumulator is reset.

The programmable threshold T 444 can depend on the AGC setting and is recommended to be computed as $T=(\frac{1}{4})(128*\sigma_s^2)^2$ where $\sigma_s^2$ is the received signal power. Since the AGC provides a constant signal plus noise power $M=(\sigma_s^2+\sigma_n^2$, o 0 dB Signal-to-Noise Ratio (SNR) can be used for a given operating M to compute the threshold T. For ADC range ±1, the full-scale power can be 2. If a significant AGC error is expected (in fast fading), it should be considered when computing the threshold. The threshold should be computed for a negative AGC error that favors high SNR operation; otherwise, the detection performance at a high SNR may degrade.

Due to gain sensitivity variation, the data collection for initial frequency acquisition is done when the correlator output is above the threshold with a frequency error detector based on the periodic structure of TDM1 and a large loop bandwidth. After the leading edge detection is declared, data acquisition for the initial frequency acquisition occurs during the flat zone (or second stage) of the acquisition procedure. The sum accumulator of the correlator is updated once every 128 input samples. Although the algorithm can stay in the second stage for 34 or more periods, the number of updates to the sum accumulator of the correlator is limited to 28. Because channels may have excess delay spread, the tail end of the TDM1 symbol is not typically periodic. As a result, the frequency estimate based on the tail end of the flat zone may not be reliable. The frequency offset is calculated by taking the arctan of the sum accumulator of the correlator.

Figure 6:
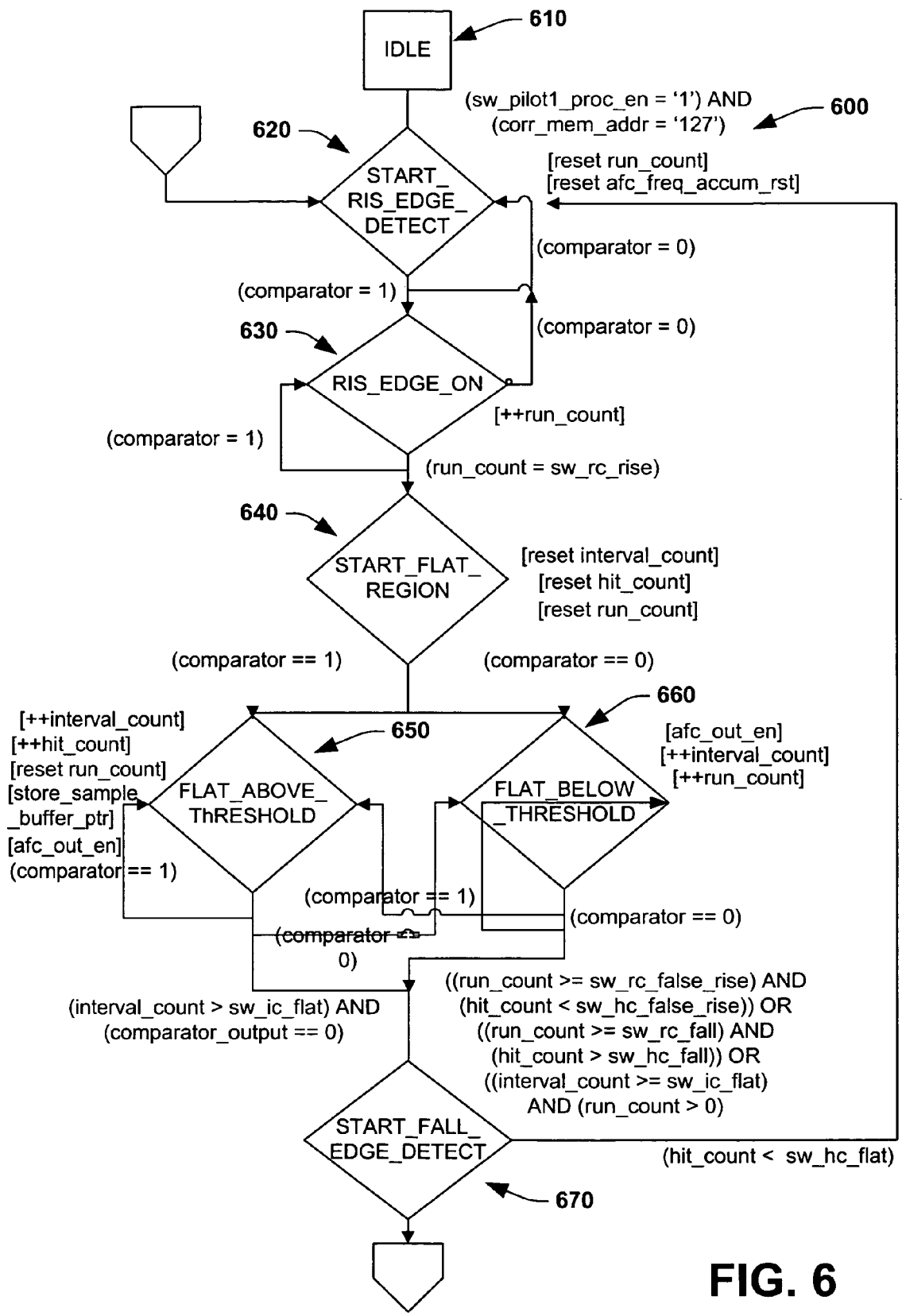
FIGS. 6 and 7 are flow diagrams illustrating example processing for time domain multiplexing pilot signals.
Figure 7:
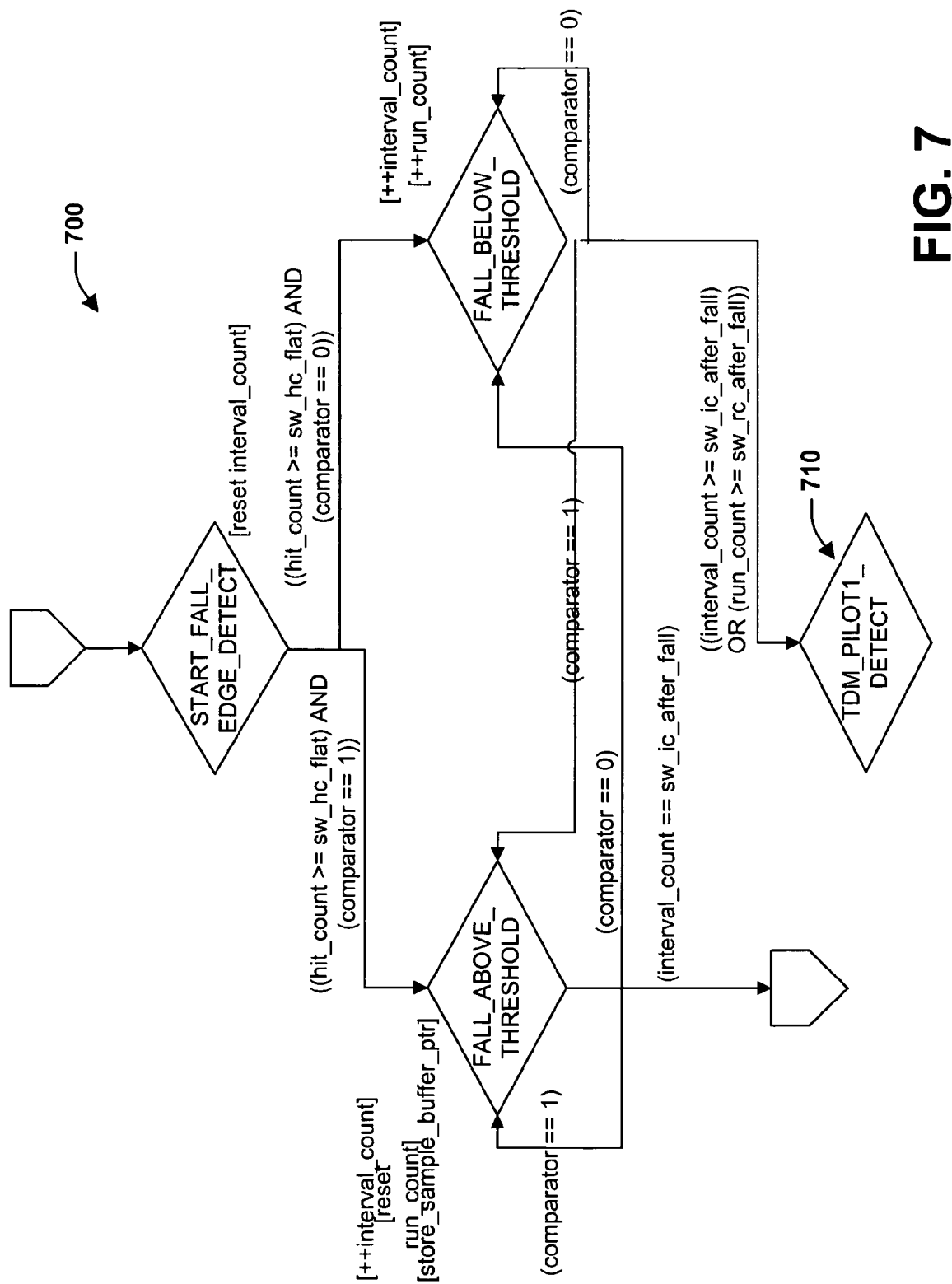

FIGS. 6 and 7 illustrate example processes 600 and 700 for time domain multiplexing pilot signals. While, for purposes of simplicity of explanation, the methodologies are shown and described as a series or number of acts, it is to be understood and appreciated that the processes described herein are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject methodologies disclosed herein.

The processes 600 and 700 depicted in FIGS. 6 and 7 relate to the state machine described above with respect to FIG. 5. In general, the state machine is in IDLE state at 610 until it is enabled by software and all memory locations in a corr_mem (Shift Register FIFO) have been written with '0's. The next state, START_RIS_EDGE_DETECT at 620, is the starting point to detect the rising edge of the comparator. In this state, a run_count counter is held in reset state. If the comparator output is '1', implying that the sum-correlator value is greater than the threshold, the state machine transitions to the RIS_EDGE_ON state at 630. At every sampling clock edge, the run_count counter is incremented by 1 if the comparator output is '1'. If the comparator is '0' on any sampling clock edge, the state machine goes from the RIS_EDGE_ON state 630 to the START_RIS_EDGE_DETECT state 620 and the process starts over again. When the run_count reaches 64, implying that for 64 consecutive samples the correlator output is '1', the state machine goes to the START_FLAT_REGION state at 640, resetting counters interval_count, hit_count, and run_count.

The interval_count counter is incremented on every sampling clock edge and tracks the number of samples elapsed; the hit_count counter tracks the number of sampling clocks for which the comparator output is '1' (i.e., comparator output is above threshold); the run_count counter tracks the number of sampling clocks in succession for which the comparator is '0'. From the START_FLAT_REGION 640, the state machine transitions to FLAT_ABOVE_THRESHOLD 650 if the comparator is '1' or to FLAT_BELOW_THRESHOLD 660 if the comparator is '0'. The state machine moves between the two states 650 and 660 depending on the value of the comparator at every sampling clock edge. In the FLAT_ABOVE_THRESHOLD state 650, if the interval_count is greater than sw_ic_flat (i.e., stayed long enough) and the comparator output is '0', the state machine proceeds to START_FALL_EDGE_DETECT state. From the FLAT_BELOW_THRESHOLD state 660, the next state is also START_FALL_EDGE_DETECT 670 based on any of the three conditions shown in FIG. 6.

The condition ((run_count>=sw_rc_false_rise) AND (hit_count<sw_hc_false_rise)) relates to the false rising edge detection in the output of the comparator. The condition ((run_count>=sw_rc_fall) AND (hit_count>=sw_hc_fall)) relates to seeing a consistent falling edge and can be either true or false detection. The condition ((interval_count>=sw_ic_flat) and (run_count>0)) ensures that the state machine does not get stuck in this state if no falling edge is detected. In the START_FALL_EDGE_DETECT state 670, the interval_count is reset. If the hit_count is less than sw_hc_flat, the state machine proceeds to START_RIS_EDGE_DETECT 620 and the process starts over again, as it implies that the correlator output was not above threshold for a sufficient time. Otherwise: If the comparator output is '1' the state machine goes to FALL_ABOVE_TH- RESHOLD 650. Then, if the interval_count equals sw_ic_after_fall, which implies that the expected "fall" is not occurring, the state machine goes to START_RIS_EDGE_DETECT 620. If the comparator output is '0', the state machine goes to FALL_BELOW_THRESHOLD 660. Then, if the interval_count exceeds sw_ic_after_fall or if the run_count exceeds sw_rc_after_fall, the state machine proceeds to TDM_PILOT1_DET state which is shown at 710 of FIG. 7 (i.e., TDM Pilot1 has been detected successfully).

Figure 8:
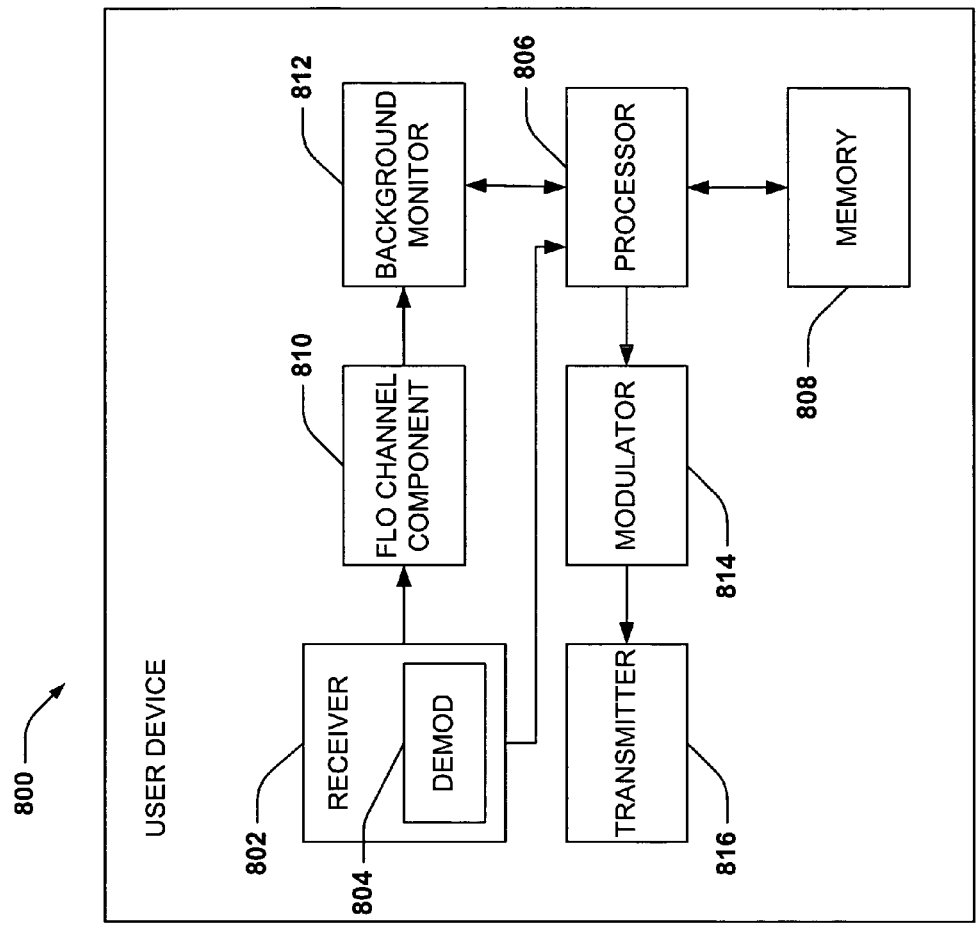
FIG. 8 is a diagram illustrating an example user device for a wireless system.

FIG. 8 is an illustration of a user device 800 that is employed in a wireless communication environment, in accordance with one or more aspects set forth herein. User device 800 comprises a receiver 802 that receives a signal from, for instance, a receive antenna (not shown), and performs typical actions thereon (e.g., filters, amplifies, down converts, etc.) the received signal and digitizes the conditioned signal to obtain samples. Receiver 802 can be a non-linear receiver. A demodulator 804 can demodulate and provide received pilot symbols to a processor 806 for channel estimation. A FLO channel component 810 is provided to process FLO signals. This can include digital stream processing and/or positioning location calculations among other processes. Processor 806 can be a processor dedicated to analyzing information received by receiver 802 and/or generating information for transmission by a transmitter 816, a processor that controls one or more components of user device 800, and/or a processor that both analyzes information received by receiver 802, generates information for transmission by transmitter 816, and controls one or more components of user device 800. A memory may also be provided to facilitate processor execution. It is noted that the device 800 is exemplary in nature and intended to convey general functionality. With respect to forward link only (FLO) functionality, the FLO stream can co-exist with a wireless device such as a phone but is essentially independent of normal device transmit and receive operations. Hence, a FLO channel would not employ the transmitter 816.

It will be appreciated that the data store (e.g., memories) components described herein can be either volatile memory or nonvolatile memory, or can include both volatile and non-volatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory. User device 800 further comprises a background monitor 814 for processing FLO data, a symbol modulator 814 and a transmitter 816 that transmits the modulated signal.

Figure 9:
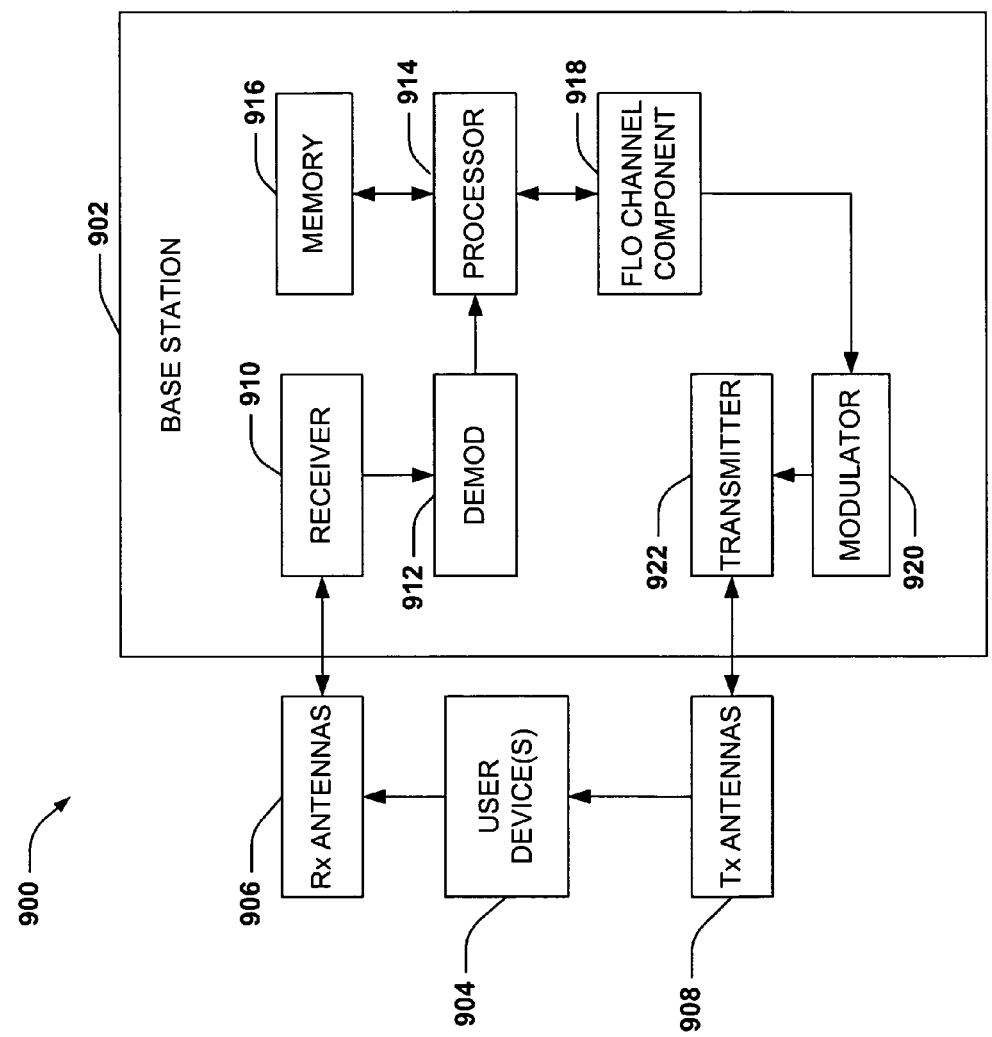
FIG. 9 is a diagram illustrating an example base station for a wireless system.

FIG. 9 is an illustrates an example system 900 that comprises a base station 902 with a receiver 910 that receives signal(s) from one or more user devices 904 through a plurality of receive antennas 906, and a transmitter 922 that transmits to the one or more user devices 904 through a transmit antenna 908. Receiver 910 can receive information from receive antennas 906 and is operatively associated with a demodulator 912 that demodulates received information. Demodulated symbols are analyzed by a processor 914 that is similar to the processor, and which is coupled to a memory 916 that stores information related to user ranks, lookup tables related thereto, and/or any other suitable information related to performing the various actions and functions set forth herein. Processor 914 is further coupled to a FLO® channel 918 component that facilitates sending FLO® information to one or more respective user devices 904. A modulator 920 can multiplex a signal for transmission by a transmitter 924 through transmit antenna 908 to user devices 904.

Figure 10:
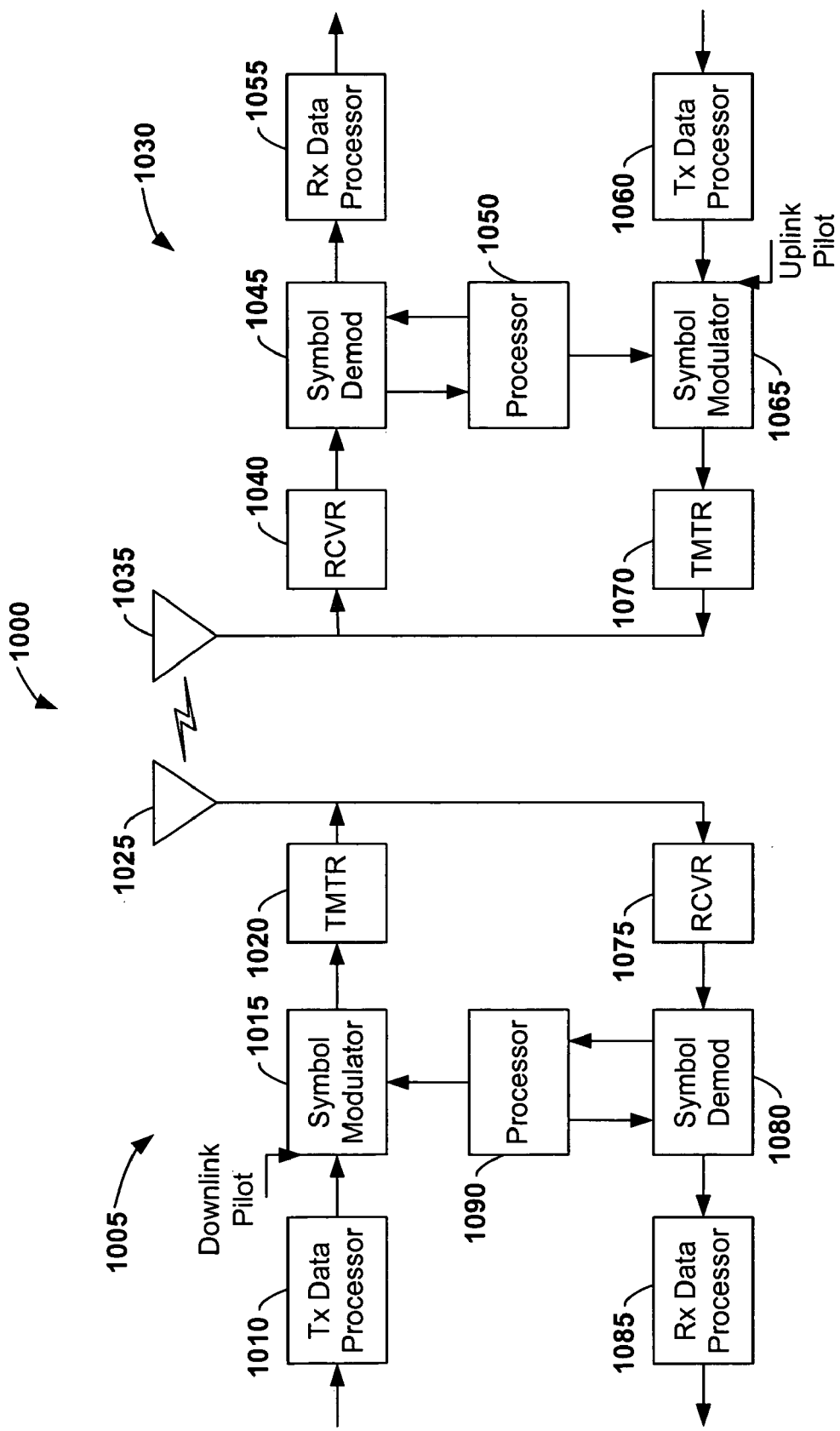
FIG. 10 is a diagram illustrating an example transceiver for a wireless system.

FIG. 10 shows an exemplary wireless communication system 1000. The wireless communication system 1000 depicts one base station and one terminal for sake of brevity. However, it is to be appreciated that the system can include more than one base station and/or more than one terminal, wherein additional base stations and/or terminals can be substantially similar or different for the exemplary base station and terminal described below.

Referring now to FIG. 10, on a downlink, at access point 1005, a transmit (TX) data processor 1010 receives, formats, codes, interleaves, and modulates (or symbol maps) traffic data and provides modulation symbols ("data symbols"). A symbol modulator 1015 receives and processes the data symbols and pilot symbols and provides a stream of symbols. A symbol modulator 1020 multiplexes data and pilot symbols and provides them to a transmitter unit (TMTR) 1020. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1020 receives and converts the stream of symbols into one or more analog signals and further conditions (e.g., amplifies, filters, and frequency up converts) the analog signals to generate a downlink signal suitable for transmission over the wireless channel. The downlink signal is then transmitted through an antenna 1025 to the terminals. At terminal 1030, an antenna 1035 receives the downlink signal and provides a received signal to a receiver unit (RCVR) 1040. Receiver unit 1040 conditions (e.g., filters, amplifies, and frequency down converts) the received signal and digitizes the conditioned signal to obtain samples. A symbol demodulator 1045 demodulates and provides received pilot symbols to a processor 1050 for channel estimation. Symbol demodulator 1045 further receives a frequency response estimate for the downlink from processor 1050, performs data demodulation on the received data symbols to obtain data symbol estimates (which are estimates of the transmitted data symbols), and provides the data symbol estimates to an RX data processor 1055, which demodulates (i.e., symbol de-maps), de-interleaves, and decodes the data symbol estimates to recover the transmitted traffic data. The processing by symbol demodulator 1045 and RX data processor 1055 is complementary to the processing by symbol modulator 1015 and TX data processor 1010, respectively, at access point 1005.

Processors 1090 and 1050 direct (e.g., control, coordinate, manage, etc.) operation at access point 1005 and terminal 1030, respectively. Respective processors 1090 and 1050 can be associated with memory units (not shown) that store program codes and data. Processors 1090 and 1050 can also perform computations to derive frequency and impulse response estimates for the uplink and downlink, respectively.

Systems and devices described herein may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1090 and 1050.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes exemplary embodiments. It is, of course, not possible to describe every conceivable combination of components or methodologies for purposes of describing the embodiments, but one of ordinary skill in the art may recognize that many further combinations and permutations are possible. Accordingly, these embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for determining synchronization information, comprising:
    employing a time domain correlation to detect the start of an Orthogonal Frequency Division Multiplexing (OFDM) super frame; and
    utilizing the time domain correlation sample sequence in a Forward Link Only system where in the sample sequence comprises an input buffer from a gain amplifier for at least 128 samples to synchronize a receiver to a frequency component of the OFDM super frame.

2. The method of claim 1, further comprising performing a complex multiplication at the output of the input buffer which operates as a correlation.

3. The method of claim 2, further comprising performing a shift register function from the complex multiplication.

4. The method of claim 3, further comprising performing a complex addition and a complex subtraction at an output of the shift register.

5. The method of claim 4, further comprising storing the complex addition and the complex subtraction in a register.

6. The method of claim 5, further comprising determining a magnitude squared value from the register.

7. The method of claim 6, further comprising comparing the magnitude squared to a predetermined threshold value to determine detection of a pilot one symbol.

8. The method of claim 7, the predetermined threshold value is programmable.

9. The method of claim 1, further comprising detecting a rising edge of a pilot symbol.

10. The method of claim 9, further comprising detecting a flat region after detecting the rising edge.

11. The method of claim 10, further comprising setting a timer to detect a length of time for the flat region.

12. The method of claim 11, further comprising resetting the counter if the flat region is not detected and re-determining a subsequent rising edge.

13. The method of claim 11, further comprising comparing the flat region to values above and below a threshold.

14. The method of claim 13, further comprising starting a falling edge detection sequence.

15. The method of claim 14, further comprising detecting a pilot symbol based on the falling edge detection sequence.

16. The method of claim 15, further comprising determining an I and Q correlation value that are supplied to an automatic frequency control component.

17. A correlator for a wireless network system, comprising:
    a time domain correlator that self-correlates a periodically repeated field of a super frame to detect a signal magnitude in the time domain; and
    a threshold detector that employs the signal magnitude to derive a start synchronization signal for the field.

18. The correlator of claim 17, further comprising at least one sampled data buffer and a delayed sample buffer.

19. The correlator of claim 17, further comprising a complex multiplier component to process pilot data.

20. The correlator of claim 17, further comprising at least one shift register FIFO to process pilot data.

21. The correlator of claim 17, further comprising a complex adder and a complex subtract component to process pilot data.

22. The correlator of claim 17, further comprising a magnitude component to determine the signal magnitude.

23. The correlator of claim 22, further comprising a comparator to determine a pilot start from the signal magnitude and a predetermined threshold.

24. The correlator of claim 23, further comprising a component to program the predetermined threshold.

25. The correlator of claim 24, further comprising at least one state machine to determine a pilot start time.

26. The correlator of claim 17, having a machine readable medium having machine executable instructions stored thereon to execute the time domain correlator or the threshold detector.

27. An apparatus for determining timing data in a wireless network, comprising:
    means for self-correlating a periodically repeated portion of a super frame to detect a signal magnitude in the time domain; and
    means for detecting the signal magnitude to determine a start timing signal for the super frame.

28. An article of manufacture including a machine readable non-transitory medium having machine excitable instruction stored thereon, comprising:
    instructions for causing a machine to self-correlate a periodically repeated portion of an Orthogonal Frequency Division Multiplexing (OFDM) data group to detect a signal magnitude in the time domain; and
    instructions for causing a machine to detect the signal magnitude to determine a start timing signal for the OFDM data group.

29. A wireless communications apparatus, comprising:
    a memory that includes a component to determine time domain correlation values by self-correlating a periodically repeated portion of a received Orthogonal Frequency Division Multiplexing (OFDM) broadcast; and a processor coupled to said memory and configured to determine a start time by comparing the time domain correlation values to a programmable threshold.

30. A processor that executes instructions for determining timing information for a wireless communication environment, the instructions configuring the processor to comprise:

means for receiving an Orthogonal Frequency Division Multiplexing (OFDM) broadcast data group;

means for determining time domain self-correlations of a periodically repeated portion of the OFDM broadcast data group; and means for determining a start time synchronization for a wireless receiver based on the time domain self-correlations and at least one threshold value.

* * * * *